United States Patent [19]

Wada

[11] 4,137,767
[45] Feb. 6, 1979

[54] ELECTROMAGNETIC FLOW METER

[75] Inventor: Norikazu Wada, Ichihara, Japan

[73] Assignee: Honeywell, Inc., Minneapolis, Minn.

[21] Appl. No.: 832,873

[22] Filed: Sep. 13, 1977

[51] Int. Cl.² .............................................. G01F 1/58
[52] U.S. Cl. ............................................. 73/194 EM
[58] Field of Search .................................. 73/194 EM

[56] References Cited

U.S. PATENT DOCUMENTS

| 3,491,593 | 1/1970 | Bailey | 73/194 EM |
| 3,589,186 | 6/1971 | Bourg | 73/194 EM |
| 4,008,609 | 2/1977 | Lambrecht et al. | 73/194 EM |

FOREIGN PATENT DOCUMENTS 1111981  5/1968  United Kingdom ............... 73/194 EM Primary Examiner—Charles A. Ruehl
Attorney, Agent, or Firm—Laurence J. Marhoefer; Lockwood D. Burton; Mitchell J. Halista

[57] ABSTRACT

An electromagnetic flow meter using pairs of concentric electrodes mounted through a pipe line in an opposed facing relationship. The output flow signals from the electrodes are first differentially amplified with respect to a common reference signal and then the output signals from the first differential amplification are differentially amplified in two successive operations to produce a final flow signal having a value "n" times the output signal from a single pair of "n" facing electrodes.

8 Claims, 3 Drawing Figures

ELECTROMAGNETIC FLOW METER

CROSS-REFERENCE TO RELATED APPLICATION

Subject matter shown but not claimed herein is shown and claimed in a copending application of Norikazu Wada, Ser. No. 832,872, filed on even date herewith and assigned to the same assignee as the present application.

BACKGROUND OF THE INVENTION

1. Field Of The Invention

The present invention relates to an electromagnetic flow meter and more particularly to an electromagnetic flow meter wherein a signal-to-noise (S/N) ratio is improved.

2. Description Of The Prior Art

In order to increase an electromotive force between detecting electrodes of the electromagnetic flow meter without increasing the density of magnetic flux applied to the flow meter, the following method has been adopted in the prior art flow meter of this kind. Namely, a plurality of electrode pairs are arranged along the wall of a fluid flow pipe along the axis of the same, and electromotive forces obtained by respective electrode pairs are composed, or summed, to establish an increased electromotive force of the detecting electrode configuration. According to the prior art flow meter of this kind, however, it is often observed that the electromotive forces of the electrode pairs are different from each other which creates a summing conflict. Further, there is another disadvantage in that the input terminal, and the leads of a converter, which is a circuit for composing the electrode signals, are apt to pick up external noise signals. Therefore, various kinds of complicated matching circuits are needed to overcome such disadvantages.

SUMMARY OF THE INVENTION

An object of the present invention is to provide an improved electromagnetic flow meter.

Another object of the present invention is to provide an improved electromagnetic flow meter having a high signal-to-noise ratio.

In accomplishing these and other objects, there has been provided, in accordance with the present invention, an electromagnetic flow meter in which a pair of electrodes opposing to each other in the fluid flow pipe are constituted with concentric electrode assemblies comprising a plurality of electrodes arranged coaxially and the flow signal values detected between corresponding electrodes of opposing electrode assemblies are differentially amplified.

BRIEF DESCRIPTION OF THE DRAWINGS

A better understanding of the present invention may be had when the following detailed description is read in connection with the accompanying drawings, in which.

DETAILED DESCRIPTION OF THE PREFERRED EMBODIMENT

Figure 1:
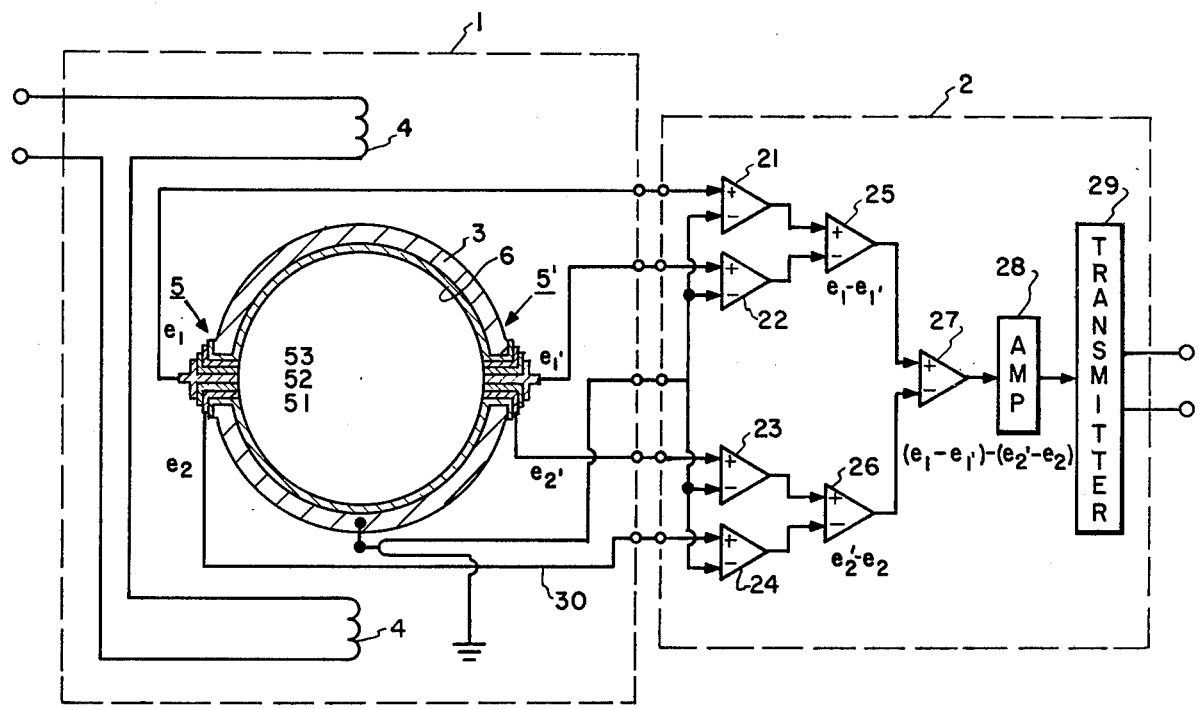
FIG. 1 is a diagrammatical representation of an embodiment of an electromagnetic flow meter according to the present invention.
Figure 2:
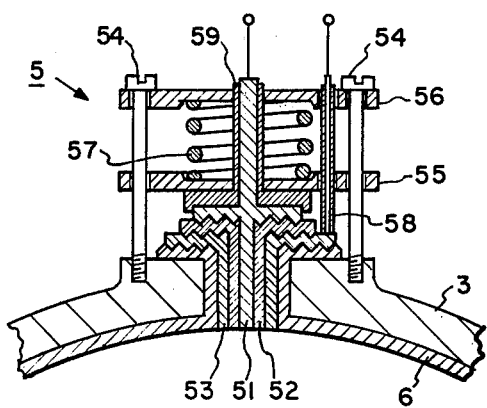
FIG. 2 and FIG. 3 are cross-sectional views of a part of the electrode assembly used in this invention as illustrated in FIG. 1.
Figure 3:
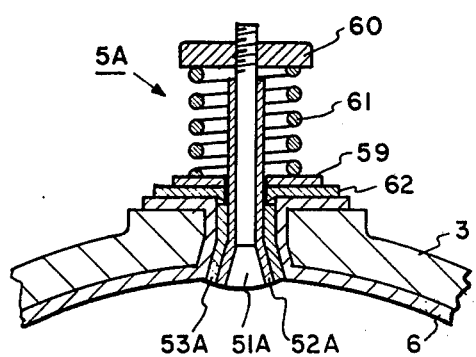

Referring to FIG. 1 in more detail, there is shown an electromagnetic flow meter embodying the present invention and using the electrodes shown in FIGS. 2 and 3. This electromagnetic flow meter includes a signal detector 1 and a signal converter 2. The detector 1 includes a pipe having a pipe wall 3 for guiding the fluid to be measured, an excitation coil 4 for generating a magnetic field in response to an energizing current which intersects the axis of the fluid pipe at a right angle, and a pair of concentric electrode assemblies 5 and 5' which are mounted through the wall 3 of the fluid pipe opposite each other. Further, the pipe wall 3 has a lining 6 for electrical insulation formed on its inner wall. The concentric electrode assembly 5 comprises a rod shaped inner electrode 51, an electrically insulating tube 52 and a hollow center electrode 53. These three electrode constituents are assembled in a coaxial relation.

The electrode assembly 5' has the same construction as the electrode assembly 5, and includes an inner electrode 51', an electrically insulating tube 52' and an outer hollow electrode 53'. The inner electrodes 51 and 51' are used as an opposing electrode pair while the outer electrodes 52 and 52' are also used as another opposing electrode pair.

A more detailed illustration of the concentric electrode assembly is shown in FIGS. 2 and 3. The complex electrode assembly shown in FIG. 2 is an external mounting type which is mounted through a hole in the pipe wall 3 in water-tight fashion by using a spring 57 that is located between a lower plate 55 and an upper plate 56 and compressed by fastening bolts 54 threaded into the pipe wall 3. The bolts 54 pass through the plates 55 and 56 while the bolt heads bear against the outer plate 56. A reference numeral 58 designates an electrode connecting rod which has an electrically insulating coating on its outer surface. The rod 58 is connected to the outer electrode 53 while the inner electrode 51 is extended through aligned holes in the plates 55 and 58 to a connection terminal past the outer plate 56. An insulating coating 59 on the extended part of the electrode 51 serves to electrically isolate the electrode 51 from the plates 55, 56 and the concentric spring 57. The electrodes 53 and 51 are provided with radially outwardly extended collars with the tube 52 having a matching collar positioned therebetween. The insulating coating 6 is extended through the hole in the pipe wall 3 and on the outside surface of the pipe wall 3 surrounding the hole in the pipe wall 3 to electrically insulate the collar of the outer electrode 53 from the pipe wall 3. When the bolts 54 are tightened into the pipe wall 3, the bolt heads bear against the outer plate 56 to compress the spring 57 whereby the inner plate 55 is urged against the collars of the electrodes 51 and 53, the tube 52 and the insulating coatings 6 and 59. Thus, the collars and insulating coatings are compressed into a layered structure to provide fluid-tight seals along with electrical insulation of the electrodes 51 and 53.

FIG. 3 shows a concentric electrode assembly of an internal mounting type wherein the complex electrode assembly 5 is inserted from the inside of the pipe 3. A center electrode 51A is formed from a straight rod having a tapered head at one end and a threaded portion at the other end. The center electrode 51A is located within an electrically insulating sleeve 52A which extends from the threaded portion to the tapered head. An electrically conductive wedge ring 62 having a raised inner lip is located on the insulating coating 6 which is extended through the hole in the pipe wall 3 and onto the pipe wall outer surface surrounding the hole in the pipe wall 3. An insulating washer 59 is located on top of the wedge ring 62. A flatened nut 60 is threaded onto the center electrode 51A while a concentric spring 61 is located between the washer 59 and the nut 60. Finally, an outer hollow cylindrical electrode 53A is located on the sleeve 52A and extends from the tapered head of the center electrode to the raised lip of the wedge ring 62. Electrical conncetions to the inner electrode 51A and the outer electrode 53A may be made at any suitable point by well-known techniques. When the nut 60 is turned down on the center electrode 51A, the spring 61 is located between insulating washer 59 and the nut 60 is compressed urge the washer 59 and ring 62 against the outer electrode 53A and to draw the tapered head of the center electrode 51A into the end of the sleeve 52A and the electrode 53A. Thus, the end of the sleeve 52A and the electrode 53A are distorted to fix the assembly 5A to the pipe wall 3 in a water-tight fashion.

The detector 1 comprising the electrode assembly 5 and 5' as constructed above is electrically connected to the converter 2 as shown in FIG. 1. More particularly, the inner electrode 51 is connected to one input of a first alternating current, i.e., AC, differential amplifier 21 while the inner electrode 51' is connected to one input of a second AC differential amplifier 22. The outer electrode 53' is connected to one input of a third AC differential amplifier 23 while the outer electrode 53 is connected to one input of a fourth AC differential amplifier 24. The other inputs of these differential amplifiers 21 through 24 are supplied with an earth potential as a reference voltage through a head 30. The outputs of amplifiers 21 and 22 are received by a fifth AC differential amplifier 25 at corresponding ones of its inputs while the outputs of amplifiers 23 and 24 are received by a sixth AC differential amplifier 26 at corresponding ones of its inputs. In the same manner, the outputs of these fifth and sixth amplifiers 25 and 26 are received by respective inputs of a seventh AC differential amplifier 27. A reference numeral 28 designates a direct current, i.e, DC, amplifier which amplifies the output of the seventh AC differential amplifier 27 to generate a DC output proportional to the fluid flow while reference numeral 29 designates a signal converter or transmitter for converting the output of said DC amplifier 28 for further transmission in a manner well-known in the art.

In the operation of the circuit constituted as set forth above, assume that the voltage induced at the inner electrode 51 of the assembly 5 is $e_1$, that the voltage induced at the outer electrode 53 is $e_2$, that the voltage induced at the inner electrode 51' of the assembly 5' is $e_1'$, and that the voltage induced at the outer electrode 53' is $e_2'$. The outputs of AC differential amplifiers 21 through 24 become $e_1$, $e_2$, $e_3$ and $e_4$ respectively because the input reference voltages of those amplifiers are similar earth potentials. As a consequence, the output of the amplifier 25 becomes $(e_1-e_1')$ while the output of the amplifier 26 becomes $(e_2-e_2')$. Accordingly, the output of the amplifier 27 is expressed as $(e_1-e_1')(e_2-e_2')$. Since the detecting electrode of this invention is formed as the concentric electrode assembly, the inner and outer electrodes detect the fluid which is in almost same area so that the signals induced at two electrodes are considered as being generated at almost same time and being equal in their values. Therefore, the following relation can be established among the signals induced as above.

$$e_1 = e_2 = e, e_1' = e_2' = e'$$

As a consequence, the output of the AC differential amplifier 27 is expressed as follows.

$$(e_1-e_1') - (e_2'-e_2) = 2e-2e' = 2(e-e')$$

As is apparent from the above equations, the input of the DC amplifier 28 in this embodiment is a signal which is twice as large as the difference between the voltages induced at respective facing electrodes.

In the embodiment as set forth above, the complex electrode assembly is constituted with two electrodes in coaxial relation so that the input of the DC amplifier 28 becomes twice as large as the difference of the voltage between the facing electrodes. However, where the assembly is constituted with n-facing electrodes, it is apparent that the input of the DC amplifier 28 is made "n" as large as the difference of the voltage between n-facing electrodes.

As explained above, according to this invention, the detecting electrode is constituted with the electrode assembly having a plurality of coaxial electrodes, and the outputs by the corresponding electrodes of the complex electrode assemblies are differentially amplified whereby it becomes possible to obtain the flow meter output which is in integral multiples of the voltage difference between the electrodes in response to the number of the electrodes constituting the electrode assembly. Therefore, it becomes possible to obtain a novel electromagnetic flow meter which has high S/N ratio.

Accordingly, it may be seen that there has been provided in accordance with the present invention, an improved electromagnetic flow meter having a signal-to-noise ratio.

The embodiments of the invention in which an exclusive property or privilege is claimed are defined as follows:

1. An electromagnetic flow meter comprising
electrodes opposingly disposed on the wall of a pipe for guiding fluid including a plurality of concentric electrode assemblies each having a plurality of electrodes arranged coaxially, and
differential amplifier means for flow signal values detected by respective facing pairs of electrodes of said opposing concentric electrode assemblies operative that the values amplified once are successively and differentially amplified further, whereby the flow representative value attained in the final differential amplification is an integral multiple of the voltage difference between said respective pairs of electrodes.

2. An electromagnetic flow meter as set forth in claim 1 wherein each of said electrode assemblies have two electrodes.

3. An electromagnetic flow meter as set forth in claim 1 wherein said differential amplifier means includes a first plurality of AC differential amplifiers for comparing respective ones of the electrode output flow signal with a common reference level.

4. An electromagnetic flow meter as set forth in claim 3 wherein said differential amplifiers means includes a second plurality of AC differential amplifiers for comparing pairs of output signals from said first plurality of amplifiers.

5. An electromagnetic flow meter as set forth in claim 4 wherein said differential amplifier means includes a third AC differential amplifier for comparing output signals from said second plurality of amplifiers.

6. An electromagnetic flow meter as set forth in claim 5 wherein each of said electrode assemblies have two electrodes, said first plurality of amplifiers has four amplifiers, said second plurality of amplifiers has two amplifiers and said third amplifier is a single amplifier.

7. An electromagnetic flow meter as set forth in claim 6 wherein said common reference signal is a ground reference level.

8. An electromagnetic flow meter as set forth in claim 7 and including magnetic field producing means arranged to respond to an energizing signal to produce a magnetic field at right angles to a centerline passing through said coaxial electrodes and to the flow path of the fluid in the pipe.

* * * * *